(12) United States Patent
Tsuda et al.

(10) Patent No.: US 7,913,674 B2
(45) Date of Patent: Mar. 29, 2011

(54) ABNORMALITY DETERMINATION DEVICE AND METHOD FOR EGR DEVICE, AND ENGINE CONTROL UNIT

(75) Inventors: Masaki Tsuda, Saitama-ken (JP); Hirofumi Hara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 12/256,985

(22) Filed: Oct. 23, 2008

(65) Prior Publication Data

US 2009/0126707 A1 May 21, 2009

(30) Foreign Application Priority Data

Nov. 16, 2007 (JP) ................................ 2007-297673

(51) Int. Cl.
*F02B 47/08* (2006.01)
*F02B 47/10* (2006.01)
(52) U.S. Cl. .................... 123/568.16; 701/108
(58) Field of Classification Search ............. 123/568.16, 123/568.21, 568.22, 568.11, 585; 701/108; 73/114.74

See application file for complete search history.

(56) References Cited

U.S. PATENT DOCUMENTS

| 5,201,303 A | * | 4/1993 | Kojima | ................... | 123/704 |
| 5,653,212 A | * | 8/1997 | Hotta et al. | .............. | 123/568.16 |

FOREIGN PATENT DOCUMENTS

| EP | 1239142 A2 | * | 9/2002 |
| JP | 7-103831 B2 | | 11/1995 |
| JP | 2001-182602 A | | 7/2001 |

* cited by examiner

*Primary Examiner* — Mahmoud Gimie
(74) *Attorney, Agent, or Firm* — Arent Fox LLP (57) ABSTRACT

An abnormality determination device for an EGR device, which is capable of determining the abnormality of the EGR device properly without interrupting the EGR operation. An ECU of an internal combustion engine detects an amount of fresh air drawn into a combustion chamber of the engine, carries out feedback control of the fresh air amount such that the detected fresh air amount converges to a predetermined target fresh air amount by controlling an opening of a throttle valve disposed in an intake system of the engine during execution of EGR by the EGR device. The ECU obtains a decreasing degree parameter which represent a degree of decrease in the fresh air amount caused by the feedback control, and determines abnormality of the EGR device based on the obtained decreasing degree parameter.

18 Claims, 9 Drawing Sheets

| | LOW ← NE → HIGH |
|---|---|
| SMALL ↑ PMCMD ↓ LARGE | $\triangle PNG_{11}$ ········ $\triangle PNG_{1j}$ <br> ⋮ <br> $\triangle PNG_{i1}$ ········ $\triangle PNG_{ij}$ |

| | LOW ← NE → HIGH | |
|---|---|---|
| SMALL ↑ PMCMD ↓ LARGE | $\Delta QEGRNG11$ ········ | $\Delta QEGRNG1j$ |
| | $\Delta QEGRNGi1$ ········ | $\Delta QEGRNGij$ |

ABNORMALITY DETERMINATION DEVICE AND METHOD FOR EGR DEVICE, AND ENGINE CONTROL UNIT

BACKGROUND OF THE INVENTION

1. Field of the Invention

The present invention relates to an abnormality determination device and device for an EGR device, for determining abnormality of the EGR device that recirculates part of exhaust gases exhausted from an internal combustion engine to an intake system thereof, and an engine control unit.

2. Description of the Related Art

Conventionally, there has been proposed an abnormality determination device of this kind in Japanese Patent Publication (Kokoku) No. H07-103831. In a control system of an internal combustion engine described in this publication, an operation for recirculating exhaust gases (hereinafter referred to as "EGR operation") is carried out by an EGR device depending on operating conditions of the engine. Further, the control system performs an air-fuel ratio feedback control by calculating a feedback-controlled variable, e.g. a fuel injection amount, such that the air-fuel ratio of an air-fuel mixture detected by an air-fuel ratio sensor becomes equal to the stoichiometric air-fuel ratio.

Further, in this control system, the determination of abnormality of the EGR device is carried out as follows: While executing the EGR operation, a feedback-controlled variable is stored which is calculated during execution of the air-fuel ratio feedback control. Next, while continuing the air-fuel ratio feedback control, the EGR operation is temporarily interrupted, and a feedback-controlled variable which is calculated in this state is stored.

Then, the difference between the feedback-controlled variable calculated during execution of the EGR operation and that calculated during interruption of the EGR operation is calculated. If the difference is smaller than a predetermined threshold value, it is determined that the EGR device is faulty. This is because assuming that the EGR device is normal, in accordance with an increase in the amount of fresh air caused by interruption of the EGR operation, the feedback control causes the fuel injection amount to be calculated to be increased so as to make the air-fuel ratio equal to the stoichiometric ratio, which means that the feedback-controlled variable calculated at this time should be larger than a value calculated during execution of the EGR operation.

However, the conventional abnormality determination device has to interrupt the EGR operation, for the purpose of the determination, during the air-fuel ratio feedback control. This makes it impossible to obtain the effect of EGR during the interruption of the EGR operation, causing e.g. an increase in the amount of emission of NOx, and therefore there is a fear that exhaust emissions are increased, and drivability is degraded.

SUMMARY OF THE INVENTION

It is an object of the present invention to provide an abnormality determination device and method for an EGR device, and an engine control unit, which are capable of determining the abnormality of the EGR device properly without interrupting the EGR operation.

To attain the above object, in a first aspect of the present invention, there is provided an abnormality determination device for determining abnormality of an EGR device that recirculates part of exhaust gases exhausted from a combustion chamber of an internal combustion engine to an intake system of the engine, comprising a throttle valve that is provided in the intake system, fresh air amount-detecting means for detecting an amount of fresh air drawn into the combustion chamber of the engine, fresh air amount control means for feedback-controlling the amount of fresh air such that the detected amount of fresh air converges to a predetermined target fresh air amount, by controlling an opening of the throttle valve during execution of an operation by the EGR device for recirculating exhaust gases, decreasing degree parameter-obtaining means for obtaining a decreasing degree parameter indicative of a degree of decrease in the amount of fresh air caused by the feedback control, and abnormality determination means for determining abnormality of the EGR device based on the obtained decreasing degree parameter.

With the configuration of this abnormality determination device, during execution of the operation by the EGR device for exhaust gas recirculation, the amount of fresh air detected by the fresh air amount-detecting means is feedback-controlled such that it converges to a predetermined target fresh air amount, by the fresh air amount control means controlling the opening of the throttle valve. Further, the decreasing degree parameter indicative of a degree of decrease in the amount of fresh air caused by the feedback control is obtained, and an abnormality of the EGR device is determined by the abnormality determination means based on the decreasing degree parameter.

For example, if the EGR device suffers from an abnormality that it is incapable of recirculating exhaust gases or an abnormality that the amount of exhaust gas recirculation is insufficient (hereinafter both generally referred to as "reduced EGR amount abnormality") caused by clogging of a passage through which exhaust gases are recirculated, the amount of fresh air which is drawn into a combustion chamber increases with a decrease in the amount of exhaust gases which are actually recirculated to the intake system. If the feedback control by the fresh air amount control means is carried out under such conditions, the opening of the throttle valve is controlled to be reduced so as to cause the increased fresh air amount to converge to the predetermined target fresh air amount, whereby the fresh air amount is controlled to be smaller. For this reason, the degree of decrease in the amount of fresh air caused by the feedback control appropriately reflects the status of the reduced EGR amount abnormality of the EGR device. Therefore, by obtaining the decreasing degree parameter indicative of the degree of decrease in the amount of fresh air at this time, and determining the abnormality of the EGR device based on the decreasing degree parameter, it is possible to properly perform the abnormality determination.

Further, differently from the above-described conventional abnormality determination device, it is not necessary to interrupt the EGR operation for the purpose of the determination. This prevents inconveniences which would be otherwise caused by interruption of the EGR operation, and hence it is possible to maintain excellent reduction of exhaust emissions and excellent drivability.

Preferably, the decreasing degree parameter-obtaining means detects the opening of the throttle valve as the decreasing degree parameter, and the abnormality determination means determines the abnormality of the EGR device based on a result of comparison between the detected opening of the throttle valve and a predetermined threshold value.

With the configuration of this preferred embodiment, since the amount of fresh air is controlled by the opening of the throttle valve, the opening of the throttle valve detected during the feedback control of the amount of fresh air directly represents the degree of decrease in the amount of fresh air at this time. Therefore, the abnormality determination device can properly determine the abnormality of the EGR device by using the opening of the throttle valve as the decreasing degree parameter, and performing the determination based on a result of comparison between the detected opening of the throttle value and the predetermined threshold value.

Preferably, the decreasing degree parameter-obtaining means detects upstream-downstream differential pressure across the throttle valve which is a difference in pressure between an upstream side and a downstream side of the throttle valve, as the decreasing degree parameter, and the abnormality determination means determines the abnormality of the EGR device based on a result of comparison between the detected upstream-downstream differential pressure and a predetermined threshold value.

As the opening of the throttle valve is smaller, pressure on the downstream side of the throttle valve becomes lower, which increases the differential pressure between the upstream side and the downstream side of the throttle valve. For this reason, the upstream-downstream differential pressure across the throttle valve detected during the feedback control excellently represents the degree of decrease in the amount of fresh air at this time. Therefore, with the configuration of this preferred embodiment, it is possible to properly determine the abnormality of the EGR device by using the upstream-downstream differential pressure as the decreasing degree parameter, and performing the determination based on a result of comparison between the detected upstream-downstream differential pressure and the predetermined threshold value.

Preferably, the decreasing degree parameter-obtaining means estimates an insufficient amount of exhaust gas recirculation for an amount of exhaust gas recirculation to be obtained when the EGR device is normal, based on a difference in pressure between an upstream side and a downstream side of the throttle valve, as the decreasing degree parameter, and the abnormality determination means determines the abnormality of the EGR device based on a result of comparison between the estimated insufficient amount of exhaust gas recirculation and a predetermined threshold value.

With the configuration of the preferred embodiment, the insufficient amount of exhaust gas recirculation for the amount of exhaust gas recirculation to be obtained when the EGR device is normal is estimated based on the upstream-downstream differential pressure between the upstream side and the downstream side of the throttle valve detected during the feedback control. The insufficient exhaust gas recirculation is caused by the reduced EGR amount abnormality, and the estimated insufficient amount of exhaust gas recirculation corresponds to the reduced amount of intake air amount caused by the feedback control. Therefore, it is possible to properly determine the abnormality of the EGR device, by using the insufficient amount of exhaust gas recirculation, as the decreasing degree parameter, and performing the determination based on a result of comparison between the insufficient amount of exhaust gas recirculation which is quantified by the estimation and the predetermined threshold value.

More preferably, the predetermined threshold value is set in advance, based on the decreasing degree parameter obtained when the EGR device is abnormal, according to operating conditions of the engine.

With the configuration of the preferred embodiment, the predetermined threshold value for comparison with the decreasing degree parameter is set in advance based on the decreasing degree parameter obtained when the EGR device is abnormal according to operating conditions of the combustion engine. Therefore, it is possible to properly set the threshold value in a fine-grained manner according to actual operating conditions of the engine at the time of the determination, thereby making it possible to further enhance the accuracy of the abnormality determination.

Preferably, the abnormality determination device further comprises operating region-determining means for determining whether or not the engine is in a predetermined operating region in which the EGR device should recirculate exhaust gases in an amount larger than a predetermined amount, and the abnormality determination means executes determination of the abnormality of the EGR device when it is determined that the engine is in the predetermined operating region.

As described hereinabove, the present invention is directed to the determination of abnormality of the EGR device, based on the degree of decrease in the amount of fresh air caused by the feedback control of the amount of fresh air which increases with a decrease in the amount of exhaust gas recirculation due to the abnormality of the EGR device. Therefore, it is desirable that the amount of exhaust gas recirculation to be expected for the normal condition of the EGR device is large. Otherwise, a tendency to decrease in the fresh air amount caused by the feedback control is not made apparent enough, which may cause erroneous determination. With the configuration of the preferred embodiment, the abnormality determination device carries out the abnormality determination on condition that the engine is in the predetermined operating region in which exhaust gases are to be recirculated in an amount larger than the predetermined amount. This prevents occurrence of erroneous determination, and makes it possible to maintain excellent accuracy of the abnormality determination.

To attain the above object, in a second aspect of the present invention, there is provided an abnormality-determining method for determining abnormality of an EGR device that recirculates part of exhaust gases exhausted from a combustion chamber of an internal combustion engine to an intake system of the engine, the intake system including a throttle valve that is provided therein, comprising a fresh air amount-detecting step of detecting an amount of fresh air drawn into the combustion chamber of the engine, a fresh air amount control step of feedback-controlling the amount of fresh air such that the detected amount of fresh air converges to a predetermined target fresh air amount, by controlling an opening of the throttle valve during execution of an operation by the EGR device for recirculating exhaust gases, a decreasing degree parameter-obtaining step of obtaining a decreasing degree parameter indicative of a degree of decrease in the amount of fresh air caused by the feedback control, and an abnormality-determining step of determining abnormality of the EGR device based on the obtained decreasing degree parameter.

With the configuration of the abnormality-determining method according to the second aspect of the present invention, it is possible to obtain the same advantageous effects as provided by the first aspect of the present invention.

Preferably, the decreasing degree parameter-obtaining step detects the opening of the throttle valve as the decreasing degree parameter, and the abnormality-determining step includes determining the abnormality of the EGR device based on a result of comparison between the detected opening of the throttle valve and a predetermined threshold value.

Preferably, the decreasing degree parameter-obtaining step includes detecting upstream-downstream differential pressure across the throttle valve which is a difference in pressure between an upstream side and a downstream side of the throttle valve, as the decreasing degree parameter, and the abnormality-determining step includes determining the abnormality of the EGR device based on a result of comparison between the detected upstream-downstream differential pressure and a predetermined threshold value.

Preferably, the decreasing degree parameter-obtaining step includes estimating an insufficient amount of exhaust gas recirculation for an amount of exhaust gas recirculation to be obtained when the EGR device is normal, based on a difference in pressure between an upstream side and a downstream side of the throttle valve, as the decreasing degree parameter, and the abnormality-determining step includes determining the abnormality of the EGR device based on a result of comparison between the estimated insufficient amount of exhaust gas recirculation and a predetermined threshold value.

More preferably, the predetermined threshold value is set in advance, based on the decreasing degree parameter obtained when the EGR device is abnormal, according to operating conditions of the engine.

Preferably, an abnormality-determining method further comprises an operating region-determining step of determining whether or not the engine is in a predetermined operating region in which the EGR device should recirculate exhaust gases in an amount larger than a predetermined amount, and the abnormality-determining step includes executing determination of the abnormality of the EGR device when it is determined that the engine is in the predetermined operating region.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a compute to execute an abnormality-determining method for determining abnormality of an EGR device that recirculates part of exhaust gases exhausted from a combustion chamber of an internal combustion engine to an intake system of the engine, the intake system including a throttle valve that is provided therein, wherein the abnormality-determining method comprises a fresh air amount-detecting step of detecting an amount of fresh air drawn into the combustion chamber of the engine, a fresh air amount control step of feedback-controlling the amount of fresh air such that the detected amount of fresh air converges to a predetermined target fresh air amount, by controlling an opening of the throttle valve during execution of an operation by the EGR device for recirculating exhaust gases, a decreasing degree parameter-obtaining step of obtaining a decreasing degree parameter indicative of a degree of decrease in the amount of fresh air caused by the feedback control, and an abnormality-determining step of determining abnormality of the EGR device based on the obtained decreasing degree parameter.

With the configuration of the engine control unit according to the third aspect of the present invention, it is possible to obtain the same advantageous effects as provided by the first aspect of the present invention.

Preferably, the decreasing degree parameter-obtaining step detects the opening of the throttle valve as the decreasing degree parameter, and the abnormality-determining step includes determining the abnormality of the EGR device based on a result of comparison between the detected opening of the throttle valve and a predetermined threshold value.

Preferably, the decreasing degree parameter-obtaining step includes detecting upstream-downstream differential pressure across the throttle valve which is a difference in pressure between an upstream side and a downstream side of the throttle valve, as the decreasing degree parameter, and the abnormality-determining step includes determining the abnormality of the EGR device based on a result of comparison between the detected upstream-downstream differential pressure and a predetermined threshold value.

Preferably, the decreasing degree parameter-obtaining step includes estimating an insufficient amount of exhaust gas recirculation for an amount of exhaust gas recirculation to be obtained when the EGR device is normal, based on a difference in pressure between an upstream side and a downstream side of the throttle valve, as the decreasing degree parameter, and the abnormality-determining step includes determining the abnormality of the EGR device based on a result of comparison between the estimated insufficient amount of exhaust gas recirculation and a predetermined threshold value.

More preferably, the predetermined threshold value is set in advance, based on the decreasing degree parameter obtained when the EGR device is abnormal, according to operating conditions of the engine.

Preferably, the abnormality-determining method further comprises an operating region-determining step of determining whether or not the engine is in a predetermined operating region in which the EGR device should recirculate exhaust gases in an amount larger than a predetermined amount, and the abnormality-determining step includes executing determination of the abnormality of the EGR device when it is determined that the engine is in the predetermined operating region.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

The invention will now be described in detail with reference to the drawings showing preferred embodiment thereof.

Figure 1:
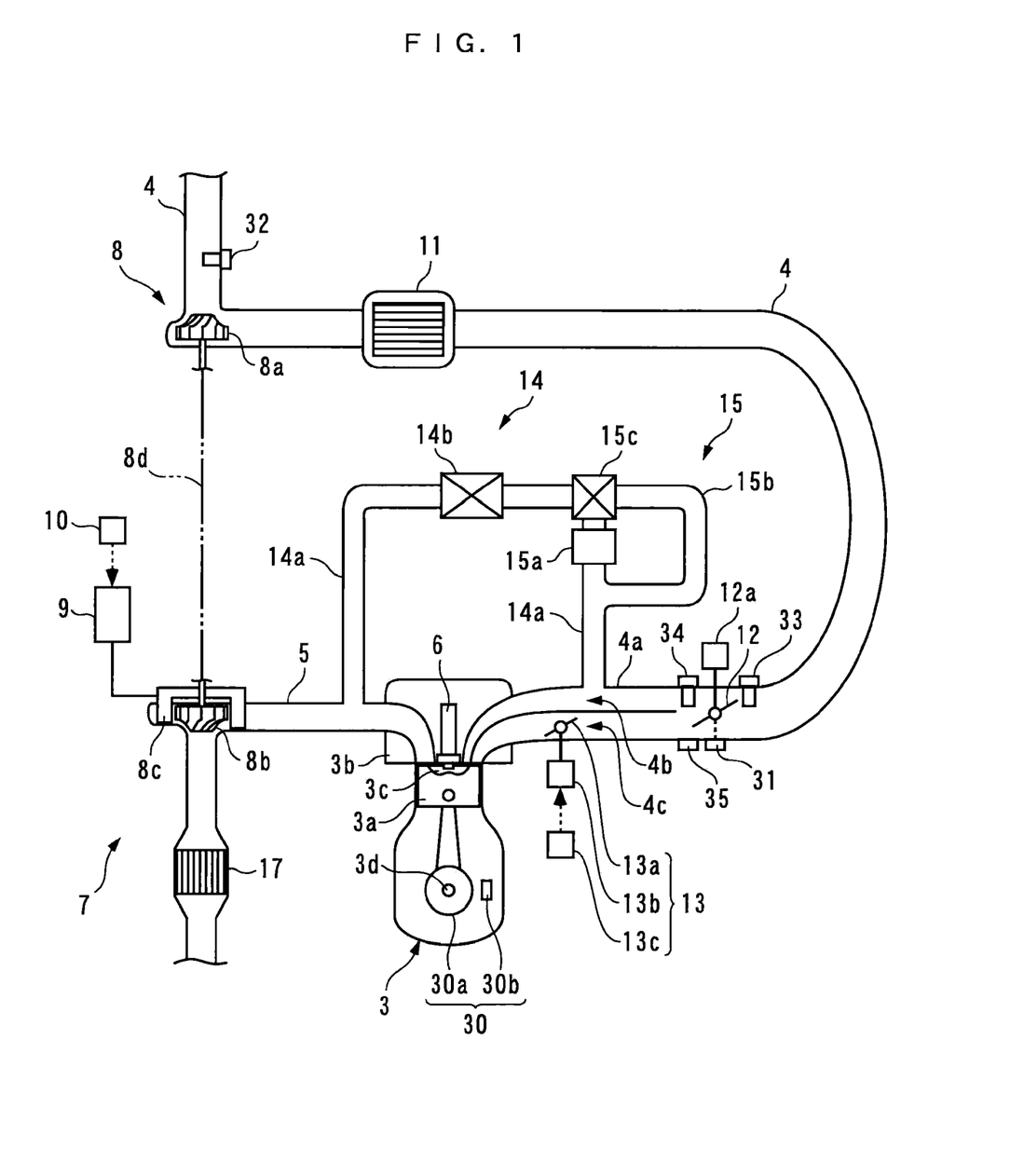
FIG. 1 is a schematic view showing an internal combustion engine to which the present invention is applied.
Figure 2:
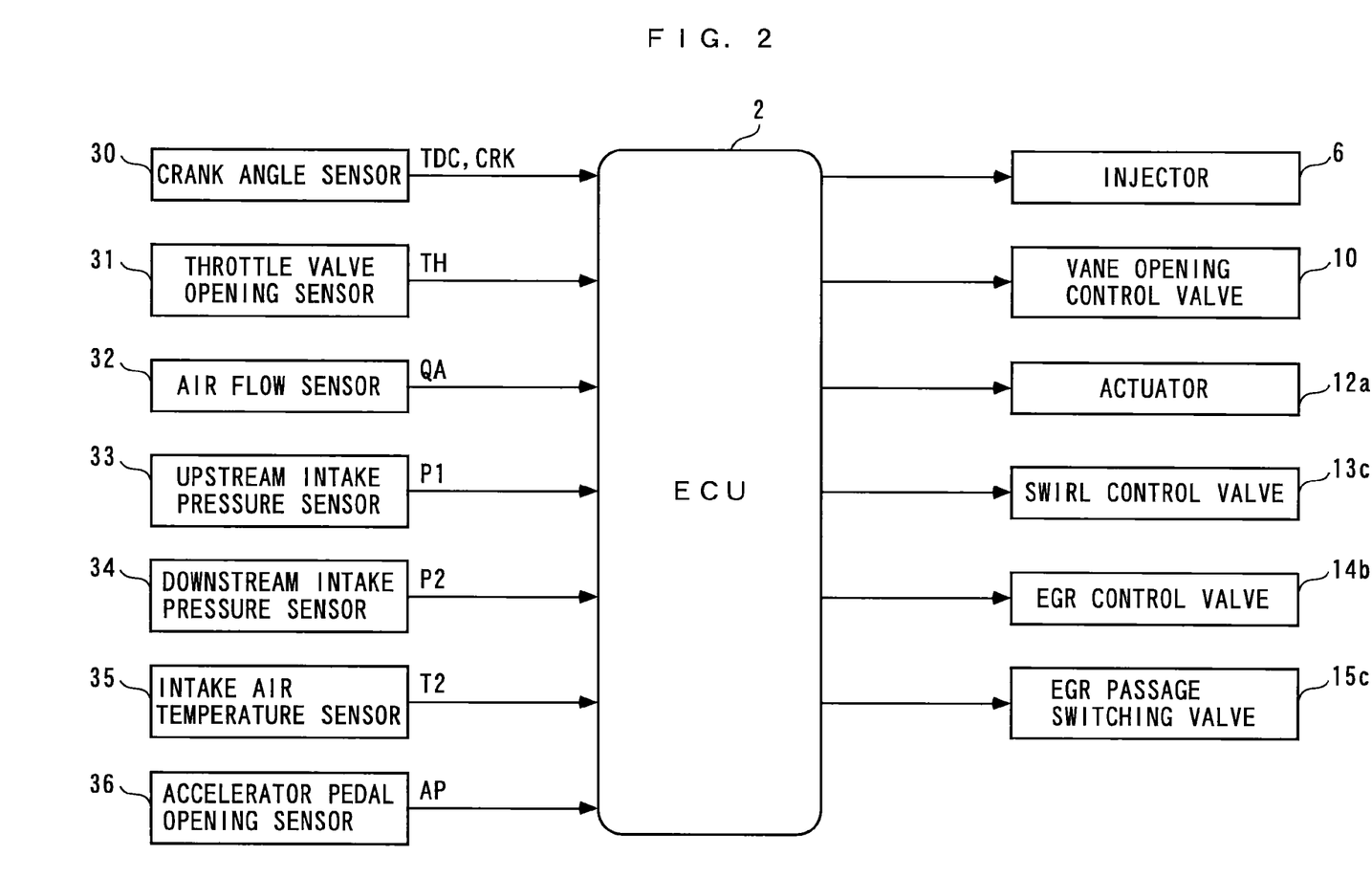
FIG. 2 is a block diagram showing an abnormality determination device according to a first embodiment of the present invention.

FIG. 1 schematically shows an internal combustion engine 3 to which the present invention is applied, and the internal combustion engine 3 includes an abnormality determination device according to a first embodiment of the present invention, which is shown in FIG. 2. The internal combustion engine (hereinafter simply referred to as the "engine") 3 is a diesel engine that has e.g. four cylinders, and is installed on a vehicle, not shown.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as the "injector") 6 mounted therethrough such that it faces the combustion chamber 3c.

The injector 6 is inserted into the combustion chamber 3c through a central portion of the top wall thereof, and injects fuel which is supplied from a fuel tank and is pressurized by a high-pressure pump, neither of which is shown, into the combustion chamber 3c. The valve-opening time period and valve-opening timing of the injector 6 are controlled by a drive signal from the ECU 2, whereby a fuel injection amount and fuel injection timing of fuel injected from the injector 6 are controlled.

A crank angle sensor 30 comprised of a magnet rotor 30a and an MRE pickup 30b is mounted on a crankshaft 3d of the engine 3. The crank angle sensor 30 delivers a CRK signal and a TDC signal, which are both pulse signals, to the ECU 2 along with rotation of the crankshaft 3d whenever the crankshaft 3d rotates through respective predetermined crank angles (e.g. 30° and 180°). The ECU 2 calculates rotational speed (hereinafter referred to as the "engine speed") NE of the engine 3 based on the CRK signal.

The intake pipe 4 has a supercharging device 7. The supercharging device 7 is comprised of a supercharger 8 which is implemented by a turbocharger, an actuator 9 connected to the supercharger 8, and a vane opening control valve 10.

The supercharger 8 includes a compressor blade 8a mounted in the intake pipe 4, a turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the turbine blade 8b and the shaft 8d is also rotated, whereby the supercharger 8 is caused to perform a supercharging operation for pressurizing intake air in the intake pipe 4.

The actuator 9 is of a diaphragm type which is operated by negative pressure, and is mechanically connected to the variable vanes 8c. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of the variable vanes 8c, whereby the boost pressure is controlled.

An intercooler 11 of a water cooling type, and a throttle valve 12 are inserted into the intake pipe 4 at respective locations downstream of the supercharger 8 from upstream to downstream in the mentioned order. The intercooler 11 is provided for cooling intake air e.g. when the temperature of the intake air is made higher by the supercharging operation of the supercharging device 7. An actuator 12a comprised e.g. of a DC motor is connected to the throttle valve 12. The opening TH of the throttle valve 12 (hereinafter referred to as the "throttle valve opening") is controlled by controlling the duty factor of electric current supplied to the actuator 12a by the ECU 2. Further, the throttle valve opening TH is detected by a throttle valve opening sensor 31 and a signal indicative of the sensed throttle valve opening TH is delivered to the ECU 2.

Further, the intake pipe 4 has an air flow sensor 32 inserted therein at a location upstream of the supercharger 8. The air flow sensor 32 detects a fresh air amount (amount of fresh air) QA, to deliver a signal indicative of the sensed fresh air amount QA to the ECU 2. Further, the intake pipe 4 has an upstream intake pressure sensor 33 and a downstream intake pressure sensor 34 inserted therein at respective locations immediately upstream and immediately downstream of the throttle valve 12. These sensors 33 and 34 detect a pressure P1 of the intake air on the upstream side of the throttle valve 12 (hereinafter referred to as the "upstream intake pressure" P1) and a pressure P2 of the intake air on the downstream side of the throttle valve 12 (hereinafter referred to as the "downstream intake pressure") P2, respectively, and deliver signals indicative of the sensed upstream and downstream intake pressures P1 and P2 to the ECU 2. The intake pipe 4 also has an intake air temperature sensor 35 that detects a temperature T2 of the intake air (hereinafter referred to as the "downstream intake air temperature" T2) at a location immediately downstream of the throttle valve 12, and delivers a signal indicative of the sensed downstream intake air temperature T2 to the ECU 2.

Further, an intake air manifold 4a of the intake pipe 4 is partitioned into a swirl passage 4b and a bypass passage 4c, from its collecting portion to its branch portions. A swirl device 13 is disposed in the bypass passage 4c, and includes a swirl valve 13a, an actuator 13b which opens and closes the swirl valve 13a, and a swirl control valve 13c. The opening of the swirl valve 13a is controlled by controlling the opening of the swirl control valve 13c by a drive signal from the ECU 2, whereby the intensity of swirl generated in the combustion chamber 3c is controlled.

Further, the engine 3 is provided with an EGR device 14 that includes an EGR pipe 14a and an EGR control valve 14b. The EGR pipe 14a extends between the intake pipe 4 and the exhaust pipe 5. More specifically, the EGR pipe 14a connects between the swirl passage 4b of the collecting portion of the intake manifold 4a and a portion of the exhaust pipe 5 upstream of the supercharger 8. Part of exhaust gases exhausted from the engine 3 is recirculated into the intake pipe 4 via the EGR pipe 14a as EGR gases, whereby combustion temperature in the combustion chamber 3c is lowered to reduce NOx contained in the exhaust gases.

The EGR control valve 14b is implemented by a linear solenoid valve inserted into the EGR pipe 14a, and the valve lift amount thereof is continuously controlled by a drive signal from the ECU 2, whereby the amount of EGR (hereinafter referred to as the "EGR amount") is controlled.

Further, the EGR device 14 includes an EGR cooling device 15 for cooling EGR gases. The EGR cooling device 15 includes an EGR cooler 15a disposed in the EGR pipe 14a at a location downstream of the EGR control valve 14b of, a bypass passage 15b which bypasses the EGR cooler 15a, and an EGR passage switching valve 15c disposed at a portion from which the bypass passage 15b branches. The EGR passage switching valve 15c selectively switches the EGR pipe 14a between a path including the EGR cooler 15a and a path including the bypass passage 15b, according to a drive signal from the ECU 2.

Further, an oxidation catalyst 17 is provided in the exhaust pipe 5 at a location downstream of the supercharger 8. The oxidation catalyst 17 oxidizes HC and CO in exhaust gases to reduce exhaust emissions.

Further, an accelerator pedal opening sensor 36 detects the amount AP of operation (stepped-on amount) of an accelerator pedal, not shown (hereinafter referred to as the "accelerator pedal opening" AP), and delivers a signal indicative of the sensed accelerator pedal opening AP to the ECU 2 (see FIG. 2).

The ECU 2 is implemented by a microcomputer comprised of an I/O interface, a CPU, a RAM, and a ROM. The detection signals from the aforementioned sensors 30 to 36 are input to the CPU after the I/O interface performs A/D conversion and waveform shaping thereon. In response to these input signals, the CPU performs various computing operations according to the control programs stored in the ROM.

The ECU 2 determines operating conditions of the engine 3 based on the detection signals from the sensors 30 to 36, and performs fuel injection control, EGR control, and control of the amount of fresh air drawn into the combustion chamber 3c, depending on the determined operating conditions.

More specifically, the ECU 2 sets a target EGR amount QEGRCMD according to the engine speed NE and demanded torque PMCMD, and controls the EGR device 14 by delivering the drive signal based on the target EGR amount QEGRCMD to the EGR control valve 14b. The above-mentioned demanded torque PMCMD is a torque which is demanded of the engine 3, and is calculated by searching a map, not shown, according to the engine speed NE and the accelerator pedal opening AP.

Further, the ECU 2 sets a target fresh air amount QACMD according to the engine speed NE and the demanded torque PMCMD, and carries out feedback control of the fresh air amount by controlling the throttle valve opening TH such that the fresh air amount QA detected by the air flow sensor 32 converges to the target fresh air amount QACMD.

Moreover, the ECU 2 executes an abnormality determination process for determining abnormality of the EGR device 14 during feedback control of the fresh air amount. It should be noted that in the present embodiment, the ECU 2 forms fresh air amount control means, decreasing degree parameter-obtaining means, abnormality determination means, and operating region-determining means.

Before describing the abnormality determination process which is executed by the abnormality determination device according to the present embodiment for determining abnormality of the EGR device 14, the principle of the abnormality determination is described. As described hereinabove, if the EGR device 14 suffers from reduced EGR amount abnormality (incapability of EGR or insufficient EGR) caused e.g. by clogging of the EGR pipe 14a or failure of closing of the EGR control valve 14b, the actual EGR amount becomes insufficient for the target EGR amount QEGRCMD, and hence the fresh air amount QA drawn into the combustion chamber 3c increases depending on the insufficient amount (hereinafter referred to as the "insufficient EGR amount") $\Delta$ QEGR.

Figure 3:
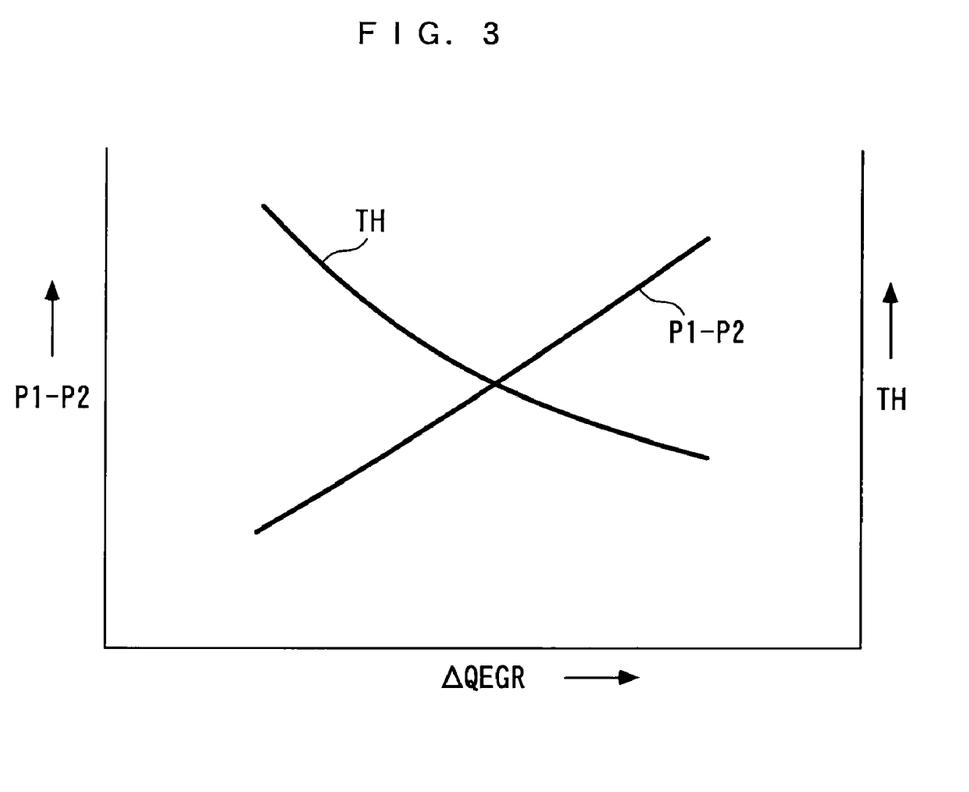
FIG. 3 is a diagram which is useful in explaining the principle of abnormality determination by an EGR device, according to the present invention.

If the feedback control of the fresh air amount is carried out under such conditions, the throttle valve opening TH is controlled to be reduced so as to cause the increased fresh air amount QA to converge to the target air amount QACMD, whereby the fresh air amount QA is controlled to be smaller. In this case, as shown in FIG. 3, as the insufficient EGR amount $\Delta$ QEGR is larger, the decreasing degree of the fresh air amount QA becomes larger, which causes the throttle valve opening TH to be narrowed to a smaller opening. Further, as shown in FIG. 3, as the throttle valve opening is smaller, the downstream intake pressure P2 becomes lower, and hence the upstream-downstream differential pressure $\Delta$ P (=P1−P2) between the upstream intake pressure P1 and the downstream intake pressure P2 becomes larger.

As described above, the amount of decrease in the fresh air amount QA caused by the feedback control is different depending on the state of the reduced EGR amount abnormality of the EGR device 14, and at the same time, the degree of decrease thereof is excellently represented e.g. by the throttle valve opening TH, the upstream-downstream differential pressure $\Delta$ P across the throttle valve 12, or the insufficient EGR amount $\Delta$ QEGR. In view of this, in the present embodiment, the determination of abnormality of the EGR device 14 is carried out using one of the above-mentioned parameters as a decreasing degree parameter of the intake air amount QA.

Figure 4:
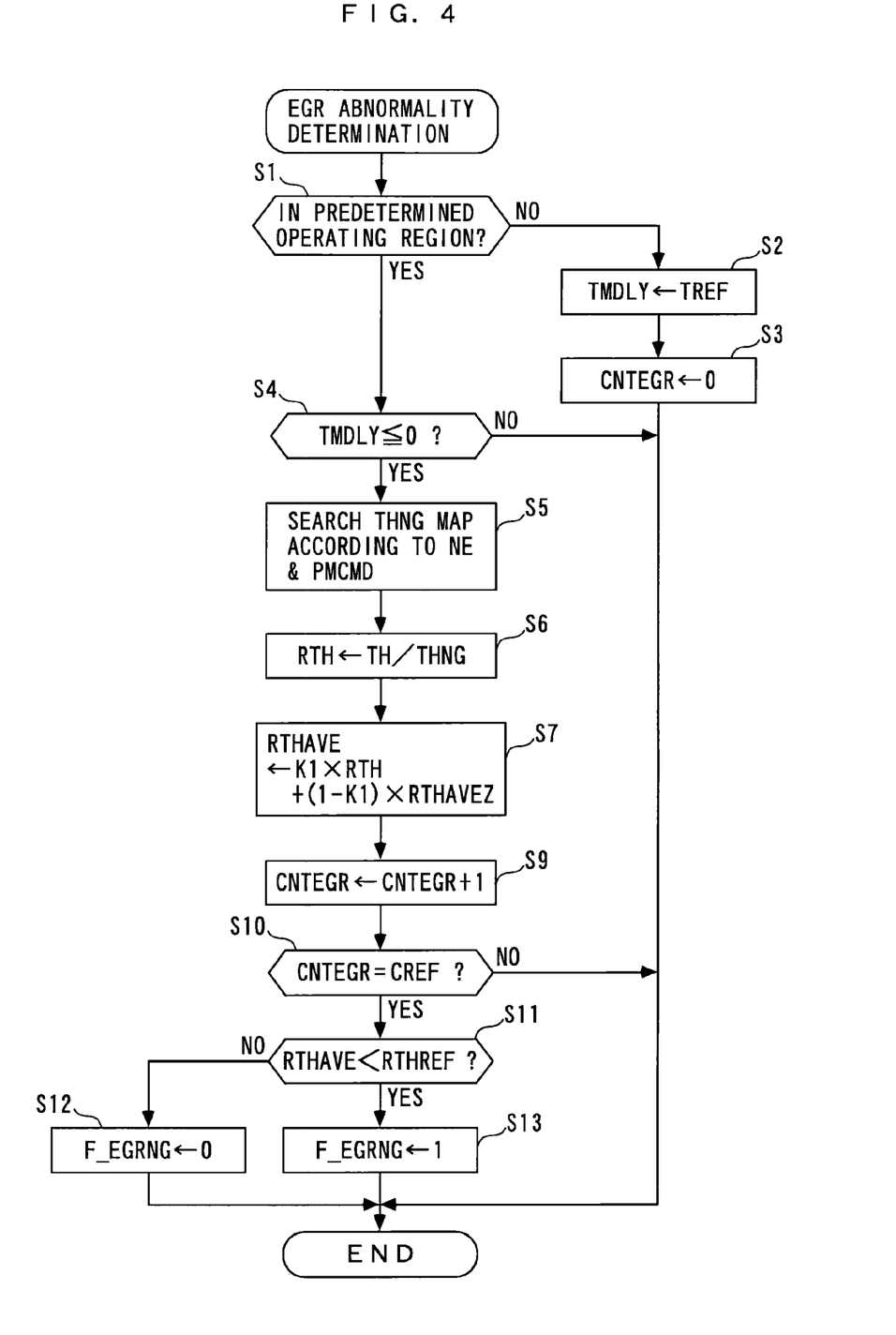
FIG. 4 is a flowchart of an abnormality determination process executed by the abnormality determining device according to the first embodiment.

FIG. 4 is a flowchart of the abnormality determination process executed by the abnormality determination device according to the first embodiment for determining abnormality of the EGR device 14. In this abnormality determination process, the throttle valve opening TH is used as the decreasing degree parameter of the intake air amount QA. This process is executed whenever a predetermined time period elapses.

First, in a step 1 (shown as S1 in abbreviated form; the following steps are also shown in abbreviated form), it is determined whether or not the engine 3 is in a predetermined operating region. This determination is carried out by searching a predetermined map. Although not shown, this map is formed by mapping the operating region of the engine 3 where the target EGR amount QEGRCMD is set to be larger than a predetermined amount according to the engine speed NE and the demanded torque PMCMD. It should be noted that this determination may be carried out by directly comparing the target EGR amount QEGRCMD set at the time with the predetermined amount.

If the answer to the question of the step 1 is negative (NO), i.e. if the engine 3 is not in the predetermined operating region, a timer value TMDLY of a stabilization timer of a down-count type is set to a predetermined time period TREF (e.g. 5 sec.) (step 2), and a counter value CNTEGR of an averaging process counter, referred to hereinafter, is reset to 0 (step 3), followed by terminating the present process.

If the answer to the question of the step 1 is affirmative (YES), it is determined whether or not the timer value TMDLY of the stabilization timer is not more than 0 (step 4). If the answer to the question of the step 4 is negative (NO), i.e. if the predetermined time period TREF has not elapsed after the engine 3 is shifted to the predetermined operating region, it is judged that the abnormality-determination should not be executed, since the EGR gases have not become stable yet, followed by immediately terminating the present process.

Figure 5:
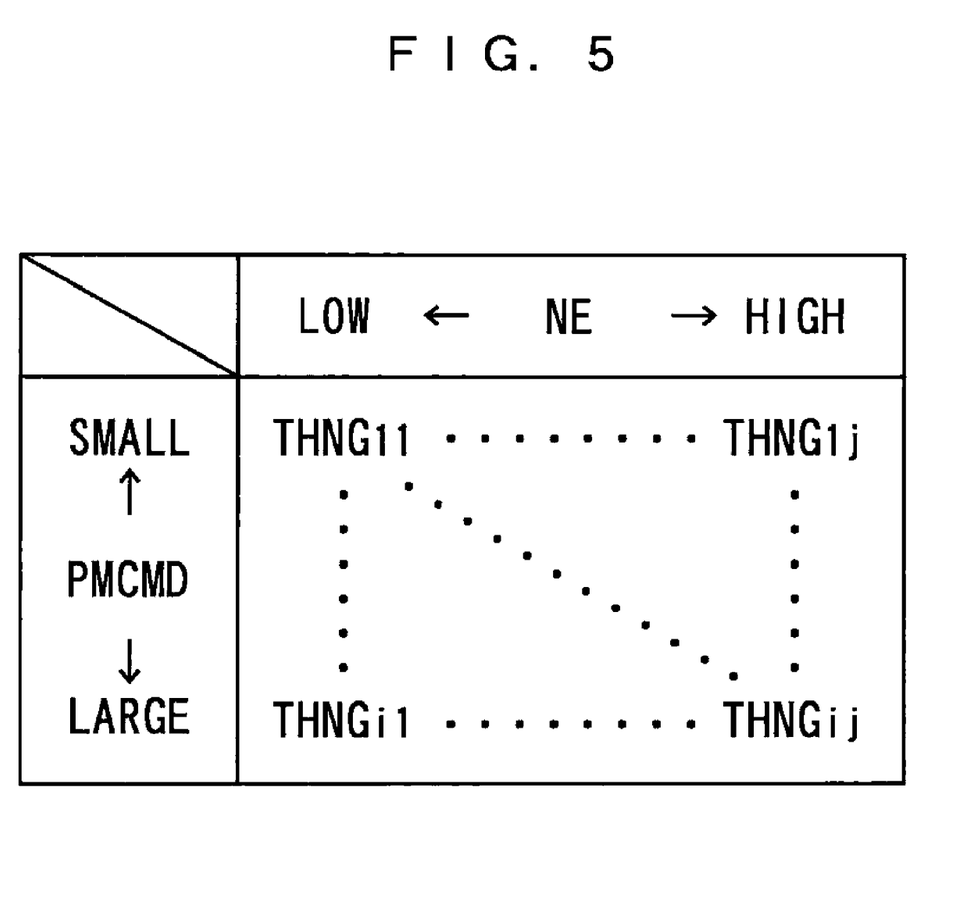
FIG. 5 is an example of a map for use in the abnormality determination process shown in FIG. 4.

If the answer to the question of the step 4 is affirmative (YES), a threshold value THNG of the throttle valve opening TH for the abnormality determination is calculated by searching a THNG map shown in FIG. 5 according to the engine speed NE and the demanded torque PMCMD (step 5). The THNG map is formed by empirically determining the throttle valve opening TH when the feedback control of the fresh air amount is executed in a state where the EGR device 14 suffers from the reduced EGR amount abnormality, and setting the threshold value THNG in advance according to the engine speed NE and the demanded torque PMCMD based on results of the empirical determination.

Next, a ratio RTH (=TH/THNG) between the detected throttle valve opening TH and the above-mentioned threshold value THNG is calculated (step 6), and an averaged value RTHAVE of the ratio RTH is calculated by performing an averaging process using the following equation (1) (step 7):

$$RTHAVE = K1 \times RTH + (1-K1) \times RTHAVEZ \qquad (1)$$

wherein K1 represents a predetermined weighting coefficient (0<K1<1), and RTHAVEZ on the right side represents the immediately preceding value of the averaged value.

Next, a counter value CNTEGR of the averaging process counter is incremented (step 9), and it is determined whether or not the counter value CNTEGR is equal to a predetermined value CREF (e.g. 10) (step 10). If the answer to the question is negative (NO), the present process is immediately terminated, whereas if the answer to the question of the step 10 is affirmative (YES), i.e. if the averaging process has been executed a number of times corresponding to the predetermined value CREF (e.g. 10 times); it is determined whether or not the averaged value RTHAVE is smaller than a predetermined reference value RTHREF (step 11).

If the answer to the question is negative (NO), i.e. if RTHAVE≧RTHREF holds, it is determined the EGR device 14 is normal, and to indicate the fact, an abnormality flag F_EGRNG is set to 0 (step 12).

On the other hand, if the answer to the question of the step 11 is affirmative (YES), i.e. if RTHAVE<RTHREF holds, it is determined the EGR device 14 suffers from the reduced EGR amount abnormality, since the throttle valve opening TH is found to be narrowed to a small opening by the feedback control of the fresh air amount. To indicate this fact, the abnormality flag F_EGRNG is set to 1 (step 13), followed by terminating the present process.

As described above, according to the present embodiment, the throttle valve opening TH obtained during feedback control of the fresh air amount is used as the decreasing degree parameter of the intake air amount QA, and the abnormality of the EGR device 14 is determined based on the ratio RTH between the throttle valve opening TH and the threshold value THNG. Therefore, this makes it possible to properly carry out the abnormality determination. Further, differently from the conventional abnormality determination device, it is not necessary to interrupt the EGR operation for the purpose of the determination, and hence no inconveniences due to the interruption of the EGR operation occur, which makes it possible to maintain excellent reduction of exhaust emissions and excellent drivability.

Furthermore, the averaged value RTHAVE obtained by carrying out the averaging process the predetermined number of times on the ratio RTH between the throttle valve opening TH and the threshold value THNG is compared with the reference value RTHREF, and hence it is possible to eliminate erroneous determination caused by noise contained in the detection signal of the throttle valve opening TH, or a temporary fluctuation of the throttle valve opening TH.

Further, the threshold value THNG is set by using the THNG map set in advance, as described above, according to the engine speed NE and the demanded torque PMCMD, so that it is possible to properly set the threshold value THNG in a fine-grained manner according to the actual operating conditions of the engine 3, thereby making it possible to further enhance the accuracy of the determination. Further, the abnormality determination is carried out only in the predetermined operating region of the engine 3 where the target EGR amount QEGRCMD is larger than the predetermined amount, so that it is possible to maintain the accuracy of the determination without causing erroneous determination.

Figure 6:
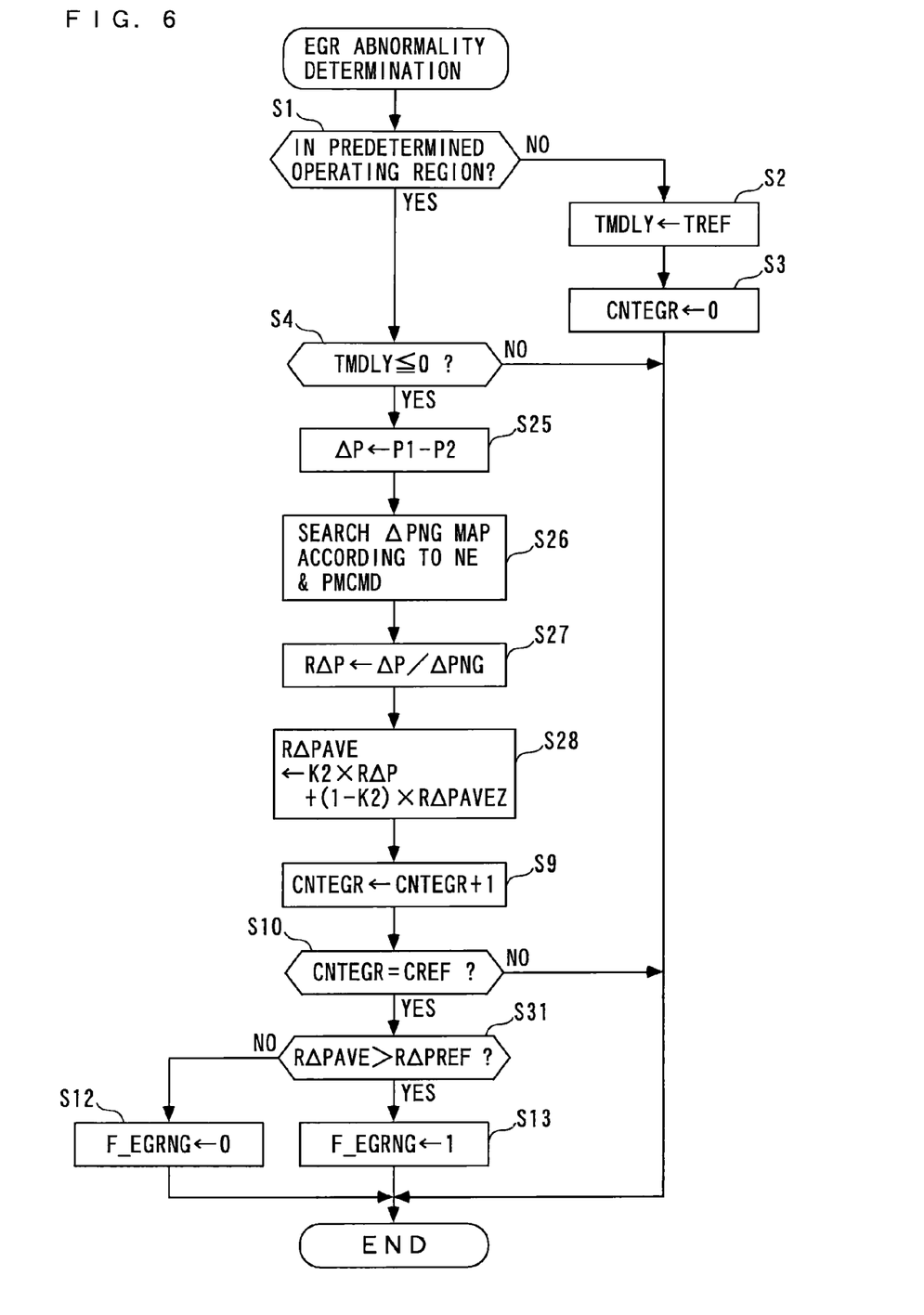
FIG. 6 is a flowchart of an abnormality determination process executed by an abnormality determining device according to a second embodiment of the present invention

FIG. 6 is a flowchart of an abnormality determination process executed by an abnormality determination device according to a second embodiment of the present invention, for determining abnormality of the EGR device 14. The abnormality determination device according to the second embodiment is identical in hardware configuration to that according to the first embodiment described above, and hence corresponding components are denoted by the same reference numerals, while omitting the description thereof. In the abnormality determination process, the upstream-downstream differential pressure $\Delta P$ across the throttle valve 12 is used as the decreasing degree parameter of the intake air amount QA. It should be noted that in FIG. 6, steps corresponding to those of the abnormality determination process in the first embodiment are denoted by same step numbers, and the following description is given mainly of different steps.

In the present embodiment, first, the steps 1 to 4 are executed similarly to the first embodiment, and when the predetermined time period TREF has elapsed after the engine 3 is shifted to the predetermined operating region (YES to the step 4), the difference (P1−P2) between the detected upstream intake pressure P1 and the detected downstream intake pressure P2 is calculated as the upstream-downstream differential pressure $\Delta P$ across the throttle valve 12 (step 25).

Figure 7:
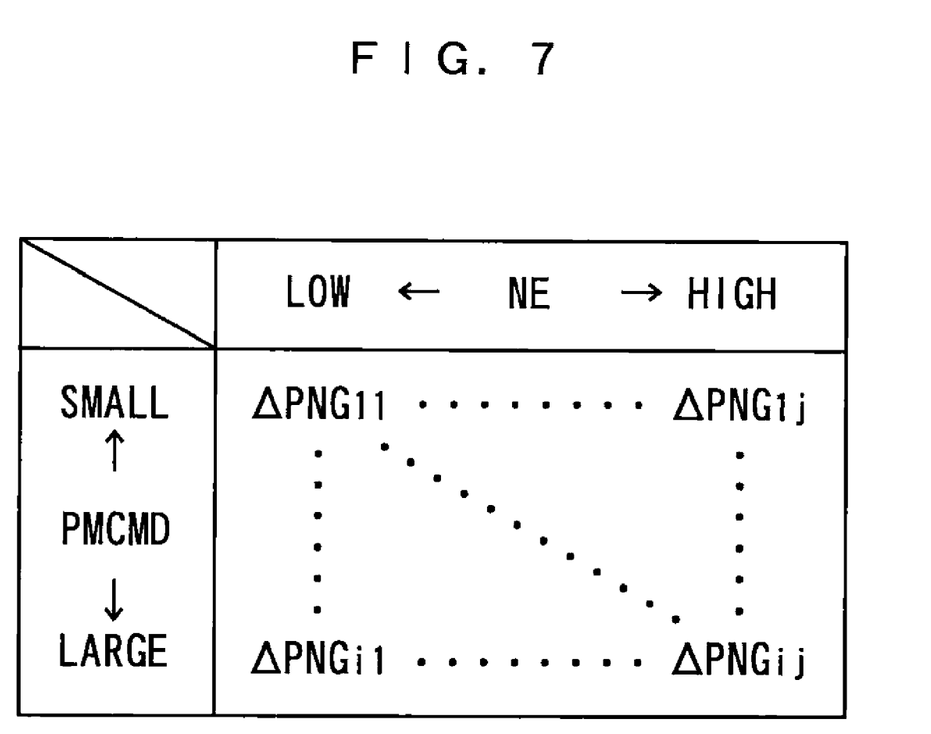
FIG. 7 is an example of a map for use in the abnormality determination process shown in FIG. 6.

Next, a threshold value $\Delta PNG$ of the upstream-downstream differential pressure $\Delta P$ for the abnormality determination is calculated by searching a $\Delta PNG$ map shown in FIG. 7 according to the engine speed NE and the demanded torque PMCMD (step 26). This $\Delta PNG$ map is formed by empirically determining the upstream-downstream differential pressure $\Delta P$ when the feedback control of the fresh air amount is executed in a state where the EGR device 14 suffers from the reduced EGR amount abnormality, and setting the threshold value $\Delta PNG$ in advance according to the engine speed NE and the demanded torque PMCMD based on results of the empirical determination.

Next, a ratio $R\Delta P$ (=$\Delta P/\Delta PNG$) between the upstream-downstream differential pressure $\Delta P$ calculated in the step 25 and the above-mentioned threshold value $\Delta PNG$ is calculated (step 27), and an averaged value $R\Delta PAVE$ of the ratio $R\Delta P$ is calculated by averaging the ratio $R\Delta P$ using the following equation (2)(step 28):

$$R\Delta PAVE = K2 \times R\Delta P + (1-K2) \times R\Delta PAVEZ \qquad (2)$$

wherein K2 represents a predetermined weighting coefficient (0<K2<1), and $R\Delta PAVEZ$ on the right side represents the immediately preceding value of the averaged value.

The following steps are practically identical to the steps 9 to 13 in the first embodiment. When the counter value CNTEGR of the averaging process counter becomes equal to the predetermined value CREF (YES to the step 10), it is determined whether or not the averaged value $R\Delta PAVE$ is larger than a predetermined reference value $R\Delta PREF$ (step 31).

If the answer to the question of the step 31 is negative (NO), i.e. if $R\Delta PAVE \leqq R\Delta PREF$ holds, it is determined that the EGR device 14 is normal, so that the abnormality flag F_EGRNG is set to 0 (step 12).

On the other hand, if the answer to the question of the step 31 is affirmative (YES), i.e. if $R\Delta PAVE > R\Delta PREF$ holds, the upstream-downstream differential pressure $\Delta P$ has become large by the feedback control of the fresh air amount, so that it is determined that the EGR device 14 suffers from reduced EGR amount abnormality, and the abnormality flag F_EGRNG is set to 1 (step 13), followed by terminating the present process.

As described above, in the present embodiment, abnormality of the EGR device 14 is determined using the upstream-downstream differential pressure $\Delta P$ across the throttle valve 12 which is obtained during feedback control of the fresh air amount as the decreasing degree parameter of the fresh air amount QA. Further, the other steps are practically identical to those in the first embodiment, and hence it is possible to obtain the same advantageous effects as described as to the first embodiment.

Figure 8:
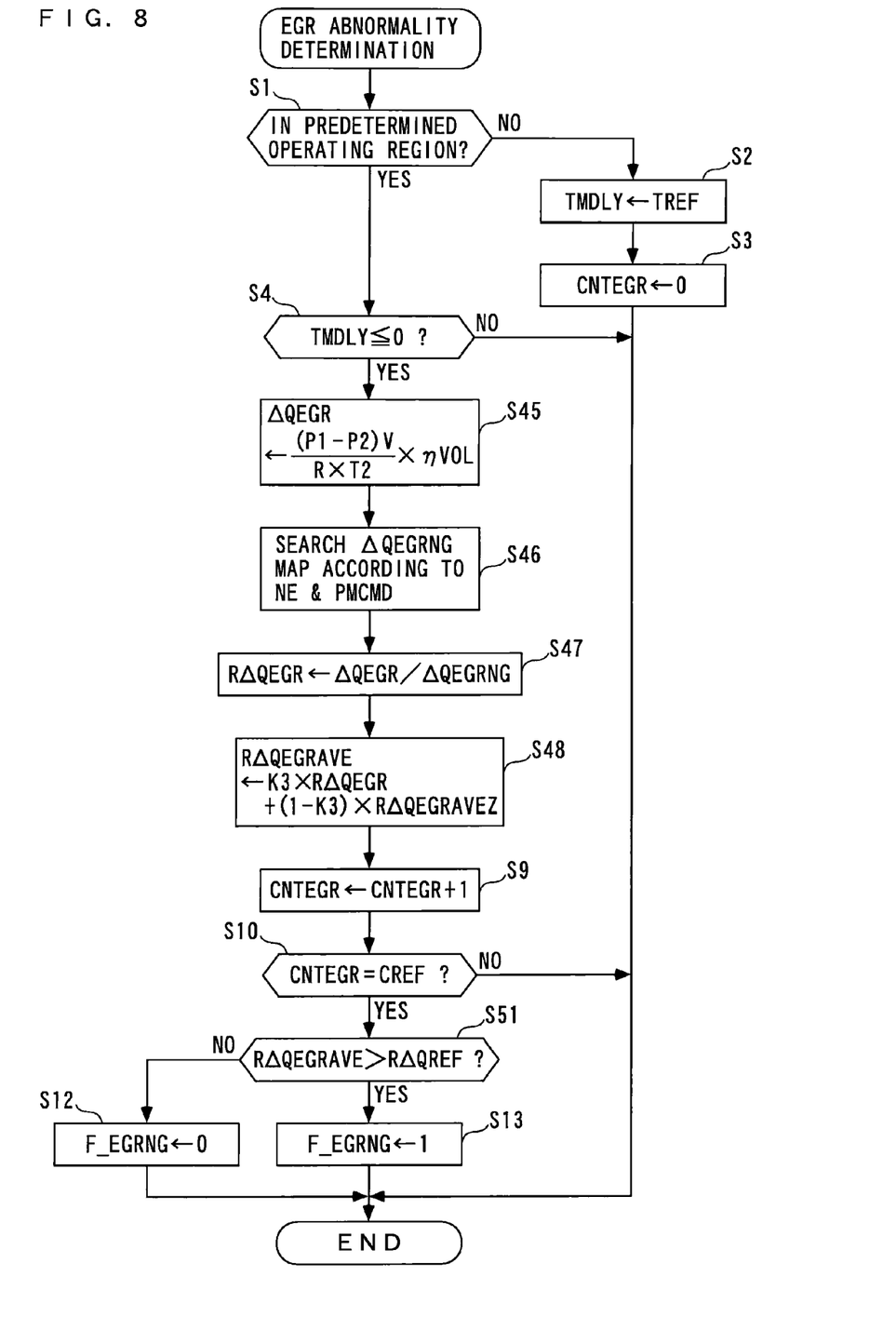
FIG. 8 is a flowchart of an abnormality determination process executed by an abnormality determining device according to a third embodiment of the present invention.

FIG. 8 is a flowchart of an abnormality determination process executed by an abnormality determination device according to a third embodiment of the present invention, for determining abnormality of the EGR device 14. The abnormality determination device according to the third embodiment is identical in hardware configuration to that according to the first embodiment described above, and hence corresponding components are denoted by the same reference numerals, while omitting the description thereof. In the abnormality determination process, the insufficient EGR amount $\Delta$ QEGR calculated from the upstream-downstream differential pressure $\Delta$ P across the throttle valve 12 is used as a decreasing degree parameter of the intake air amount QA. It should be noted that in FIG. 8, steps identical to those of the abnormality determination processes in the respective first and second embodiments are designated by the same step numbers, and the following description is given mainly of different steps.

In the present process, first, the steps 1 to 4 are executed similarly to the first and second embodiments, and after the engine 3 is shifted to the predetermined operating region, when the predetermined time period TREF has elapsed (YES to the step 4), an insufficient EGR amount $\Delta$ QEGR is calculated using the difference (P1−P2) between the detected upstream intake pressure P1 and the detected downstream intake pressure P2, i.e. the upstream-downstream differential pressure $\Delta$ P across the throttle valve 12, by the following equation (3) (step 45):

$$\Delta \text{QEGR} = ((P1-P2)V/R \cdot T2) \times \eta_{VOL} \quad (3)$$

wherein V represents the capacity of a portion downstream of the throttle valve 12, T2 the downstream intake air temperature detected by the intake air temperature sensor 35, R a gas constant, and $\eta_{VOL}$ a conversion coefficient for converting n (mole) of an equation of state of gas to a flow rate.

In this equation (3), the equation of state of gas is applied to the portion downstream of throttle valve 12, and is derived as follows: First, assuming a case of the normal condition where the EGR device 14 does not suffer from the abnormality of insufficient EGR, if the equation of state is applied to the portion downstream of the throttle valve 12, there holds the following equation (4):

$$\text{QENG} = \text{QEGR} + \text{QA} = ((P1-P2)V/R \cdot T2) \times \eta_{VOL} \quad (4)$$

wherein QENG represents a whole amount of gases which is equal to the sum of the EGR amount QEGR and the fresh air amount QA. Similarly, assuming a case where the EGR device 14 suffers from the insufficient EGR, if variables at this time are each represented by adding a symbol "'" thereto, there holds the following equation (5):

$$\text{QENG}' = \text{QEGR}' + \text{QA}' = ((P1'-P2')V/R \cdot T2') \times \eta_{VOL} \quad (5)$$

From the above equations (4) and (5), the insufficient EGR amount $\Delta$ QEGR for the EGR amount obtained when the EGR device is normal is expressed by the following equation (6):

$$\Delta QEGR = QEGR - QEGR' \quad (6)$$

$$= ((P1-P2)V/R \cdot T2) \times \eta_{VOL} - QA$$

-continued
$$= \{((P1'-P2')V/R \cdot T2') \times \eta_{VOL} - QA'\}$$

Here, when the EGR device 14 is normal, the throttle valve 12 is not narrowed during feedback control of the intake air amount but almost wide-open throttle valve opening is maintained. Therefore, P1 is approximately equal to P2, and QA is also approximately equal to QA' due to execution of the feedback control of the intake air amount. If these relations are substituted into the equation (6), there holds the following equation (7), that is, there is derived the above equation (3):

$$\Delta \text{QEGR} = ((P1'-P2')V/R \cdot T2') \times \eta_{VOL} \quad (7)$$

Figure 9:
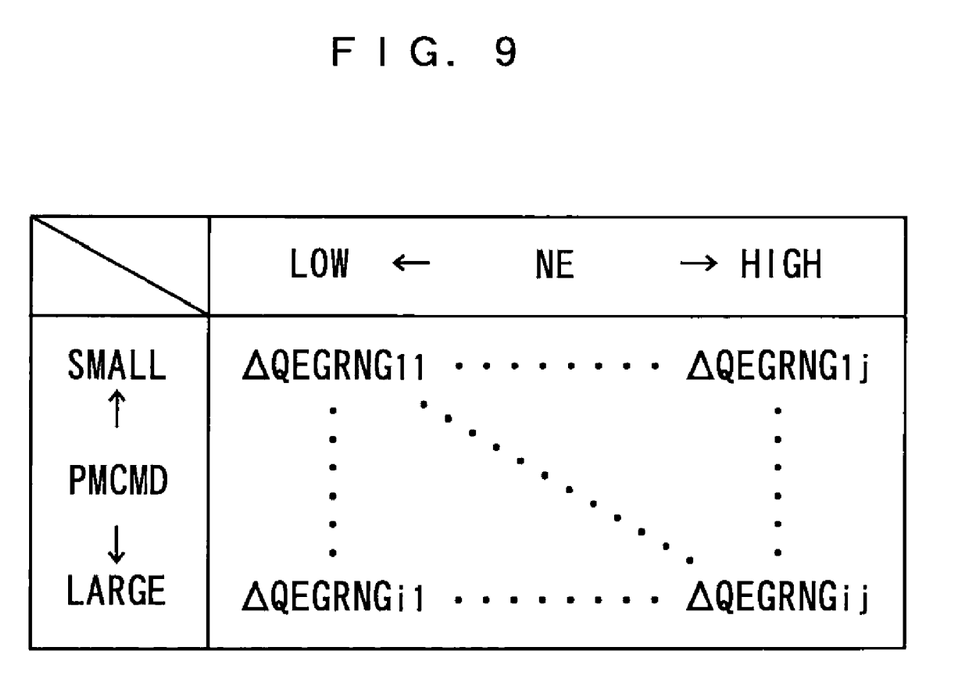
FIG. 9 is an example of a map example of a map for use in the abnormality determination process shown in FIG. 8.

After the above-mentioned calculation of the insufficient EGR amount $\Delta$ QEGR, in a step 46 appearing in FIG. 8, a threshold value $\Delta$ QEGRNG of the insufficient EGR amount $\Delta$ QEGR for the abnormality determination is calculated by searching a $\Delta$ QEGRNG map shown in FIG. 9 according to the engine speed NE and the demanded torque PMCMD. The $\Delta$ QEGRNG map is formed by empirically determining the insufficient EGR amount $\Delta$ QEGR when the feedback control of the fresh air amount is executed in a state where the EGR device 14 suffers from the reduced EGR amount abnormality, and setting the threshold value $\Delta$ QEGRNG in advance according to the engine speed NE and the demanded torque PMCMD based on results of the empirical determination.

Next, a ratio R $\Delta$ QEGR (=$\Delta$ QEGR/$\Delta$ QEGRNG) between the insufficient EGR amount $\Delta$ QEGR calculated in the step 45 and the above-mentioned threshold value $\Delta$ QEGRNG is calculated (step 47), and an averaged value R $\Delta$ QEGRAVE of the ratio R $\Delta$ QEGR is calculated by averaging the ratio R $\Delta$ QEGR using the following equation (8) (step 48):

$$R \Delta \text{QEGR AVE} = K3 \times R \Delta \text{QEGR} + (1-K3) \times R \Delta \text{QEGRAVEZ} \quad (8)$$

wherein K3 represents a predetermined weighting coefficient (0<K3<1), and R $\Delta$ QEGRAVEZ on the right side represents the immediately preceding value of the averaged value.

The following steps are practically identical to the steps 9 to 13 in the first embodiment. When the counter value CNTEGR of the averaging process counter becomes equal to the predetermined value CREF (YES to the step 10), it is determined whether or not the averaged value R $\Delta$ QEGRAVE is larger than the predetermined reference value R $\Delta$ QREF (step 51).

If the answer to the question of the step 51 is negative (NO), i.e. if R $\Delta$ QEGRAVE$\leq$R $\Delta$ QREF holds, it is determined that the EGR device 14 is normal, so that the abnormality flag F_EGRNG is set to 0 (step 12).

On the other hand, if the answer to the question of the step 51 is affirmative (YES), i.e. if R $\Delta$ QEGRAVE >R $\Delta$ QREF holds, the insufficient EGR amount $\Delta$ QEGR is large, and hence it is determined that the EGR device 14 suffers from reduced EGR amount abnormality, so that the abnormality flag F_EGRNG is set to 1 (step 13), followed by terminating the present process.

As described above, in the present embodiment, the abnormality of the EGR device 14 is determined using the insufficient EGR amount $\Delta$ QEGR which is estimated during feedback control of the fresh air amount QA as the decreasing degree parameter of the fresh air amount QA. Further, since the other steps are practically identical to those in the first and second embodiments, it is possible to obtain the same advantageous effects as obtained by the first and second embodiments. Further, particularly in this embodiment, the insufficient EGR amount Δ QEGR is estimated by using the equation of state of gas based on the upstream-downstream differential pressure Δ P, which makes it possible to compensate for influences of changes in temperature of the intake air and EGR gases, whereby it is possible to attain further enhanced accuracy of the determination.

It should be noted that the present invention is by no means limited to the above-described embodiments, but it can be practiced in various forms. For example, although in the first to third embodiments, as the decreasing degree parameter of the intake air amount QA, the throttle valve opening TH, the upstream-downstream differential pressure Δ P across the throttle valve 12, and the insufficient EGR amount Δ QEGR are employed, respectively, any other suitable parameter can be employed insofar as it is a parameter which represents the degree of decrease in the fresh air amount caused by the feedback control of the intake air amount when the EGR device 14 suffers from the reduced EGR amount abnormality.

Further, in the above-described embodiments, a decreasing degree parameter is obtained, and a ratio between the decreasing degree parameter and a threshold thereof is calculated. Further, an averaged value is obtained by performing an averaging process on the calculated ratio a predetermined number of times, and is compared with a reference value, whereby the abnormality determination is performed. However, any other suitable method can be employed. For example, one or both of the above-described calculation and the averaging process may be omitted. If both of them are omitted, the obtained decreasing degree parameter and the threshold value are directly and simply compared. Alternatively, the number of times of determining that the EGR device is abnormal, as a result of comparison between the obtained decreasing degree parameter and the threshold value, is counted, and when the calculated number reaches a predetermined value, it may be finally determined that the EGR device 14 is abnormally.

Furthermore, although in the above-described embodiment, the present invention is applied to the diesel engine, this is not limitative, but it can be applied to various engines other than a diesel engine, e.g. a gasoline engine, and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An abnormality determination device for determining abnormality of an EGR device that recirculates part of exhaust gases exhausted from a combustion chamber of an internal combustion engine to an intake system of the engine, comprising:
   a throttle valve that is provided in the intake system;
   fresh air amount-detecting means for detecting an amount of fresh air drawn into the combustion chamber of the engine;
   fresh air amount control means for feedback-controlling the amount of fresh air such that the detected amount of fresh air converges to a predetermined target fresh air amount, by controlling an opening of said throttle valve during execution of an operation by the EGR device for recirculating exhaust gases;
   decreasing degree parameter-obtaining means for obtaining a decreasing degree parameter indicative of a degree of decrease in the amount of fresh air caused by the feedback control; and
   abnormality determination means for determining abnormality of the EGR device based on the obtained decreasing degree parameter,
   wherein the parameter-obtaining means detects an opening of the throttle valve, detects an upstream-downstream differential pressure across the throttle valve, or estimates an insufficient amount of exhaust gas recirculation for an amount of exhaust gas recirculation to be obtained when the EGR device is normal, as the decreasing parameter.

2. An abnormality determination device as claimed in claim 1, wherein said decreasing degree parameter-obtaining means detects the opening of said throttle valve as the decreasing degree parameter, and
   wherein said abnormality determination means determines the abnormality of the EGR device based on a result of comparison between the detected opening of said throttle valve and a predetermined threshold value.

3. An abnormality determination device as claimed in claim 1, wherein said decreasing degree parameter-obtaining means detects upstream-downstream differential pressure across said throttle valve which is a difference in pressure between an upstream side and a downstream side of said throttle valve, as the decreasing degree parameter, and
   wherein said abnormality determination means determines the abnormality of the EGR device based on a result of comparison between the detected upstream- downstream differential pressure and a predetermined threshold value.

4. An abnormality determination device as claimed in claim 1, wherein said decreasing degree parameter-obtaining means estimates an insufficient amount of exhaust gas recirculation for an amount of exhaust gas recirculation to be obtained when the EGR device is normal, based on a difference in pressure between an upstream side and a downstream side of said throttle valve, as the decreasing degree parameter, and
   wherein said abnormality determination means determines the abnormality of the EGR device based on a result of comparison between the estimated insufficient amount of exhaust gas recirculation and a predetermined threshold value.

5. An abnormality determination device as claimed in claim 2, wherein said predetermined threshold value is set in advance, based on the decreasing degree parameter obtained when the EGR device is abnormal, according to operating conditions of the engine.

6. An abnormality determination device as claimed in claim 1, further comprising operating region-determining means for determining whether or not the engine is in a predetermined operating region in which the EGR device should recirculate exhaust gases in an amount larger than a predetermined amount, and
   wherein said abnormality determination means executes determination of the abnormality of the EGR device when it is determined that the engine is in the predetermined operating region.

7. An abnormality-determining method for determining abnormality of an EGR device that recirculates part of exhaust gases exhausted from a combustion chamber of an internal combustion engine to an intake system of the engine, the intake system including a throttle valve that is provided therein, comprising:
   a fresh air amount-detecting step of detecting an amount of fresh air drawn into the combustion chamber of the engine;

a fresh air amount control step of feedback-controlling the amount of fresh air such that the detected amount of fresh air converges to a predetermined target fresh air amount, by controlling an opening of the throttle valve during execution of an operation by the EGR device for recirculating exhaust gases;

a decreasing degree parameter-obtaining step of obtaining a decreasing degree parameter indicative of a degree of decrease in the amount of fresh air caused by the feedback control; and an abnormality-determining step of determining abnormality of the EGR device based on the obtained decreasing degree parameter, wherein the decreasing degree parameter-obtaining step detects an opening of the throttle valve, detects an upstream-downstream differential pressure across the throttle valve, or estimates an insufficient amount of exhaust gas recirculation for an amount of exhaust gas recirculation to be obtained when the EGR device is normal, as the decreasing parameter.

8. An abnormality-determining method as claimed in claim 7, wherein said decreasing degree parameter-obtaining step detects the opening of the throttle valve as the decreasing degree parameter, and wherein said abnormality-determining step includes determining the abnormality of the EGR device based on a result of comparison between the detected opening of said throttle valve and a predetermined threshold value.

9. An abnormality-determining method as claimed in claim 7, wherein the decreasing degree parameter-obtaining step includes detecting upstream-downstream differential pressure across said throttle valve which is a difference in pressure between an upstream side and a downstream side of said throttle valve, as the decreasing degree parameter, and wherein said abnormality-determining step includes determining the abnormality of the EGR device based on a result of comparison between the detected upstream-downstream differential pressure and a predetermined threshold value.

10. An abnormality-determining method as claimed in claim 7, wherein the decreasing degree parameter-obtaining step includes estimating an insufficient amount of exhaust gas recirculation for an amount of exhaust gas recirculation to be obtained when the EGR device is normal, based on a difference in pressure between an upstream side and a downstream side of said throttle valve, as the decreasing degree parameter, and wherein said abnormality-determining step includes determining the abnormality of the EGR device based on a result of comparison between the estimated insufficient amount of exhaust gas recirculation and a predetermined threshold value.

11. An abnormality-determining method as claimed in claim 8, wherein said predetermined threshold value is set in advance, based on the decreasing degree parameter obtained when the EGR device is abnormal, according to operating conditions of the engine.

12. An abnormality-determining method as claimed in claim 7, further comprising an operating region-determining step of determining whether or not the engine is in a predetermined operating region in which the EGR device should recirculate exhaust gases in an amount larger than a predetermined amount, and wherein said abnormality-determining step includes executing determination of the abnormality of the EGR device when it is determined that the engine is in the predetermined operating region.

13. An engine control unit including a control program for causing a compute to execute an abnormality-determining method for determining abnormality of an EGR device that recirculates part of exhaust gases exhausted from a combustion chamber of an internal combustion engine to an intake system of the engine, the intake system including a throttle valve that is provided therein, wherein the abnormality-determining method comprises:

a fresh air amount-detecting step of detecting an amount of fresh air drawn into the combustion chamber of the engine;

a fresh air amount control step of feedback-controlling the amount of fresh air such that the detected amount of fresh air converges to a predetermined target fresh air amount, by controlling an opening of the throttle valve during execution of an operation by the EGR device for recirculating exhaust gases;

a decreasing degree parameter-obtaining step of obtaining a decreasing degree parameter indicative of a degree of decrease in the amount of fresh air caused by the feedback control; and an abnormality-determining step of determining abnormality of the EGR device based on the obtained decreasing degree parameter, wherein the decreasing degree parameter-obtaining step detects an opening of the throttle valve, detects an upstream-downstream differential pressure across the throttle valve, or estimates an insufficient amount of exhaust gas recirculation for an amount of exhaust gas recirculation to be obtained when the EGR device is normal, as the decreasing parameter.

14. An engine control unit as claimed in claim 13, wherein said decreasing degree parameter-obtaining step detects the opening of the throttle valve as the decreasing degree parameter, and wherein said abnormality-determining step includes determining the abnormality of the EGR device based on a result of comparison between the detected opening of said throttle valve and a predetermined threshold value.

15. An engine control unit as claimed in claim 13, wherein the decreasing degree parameter-obtaining step includes detecting upstream-downstream differential pressure across said throttle valve which is a difference in pressure between an upstream side and a downstream side of said throttle valve, as the decreasing degree parameter, and wherein said abnormality-determining step includes determining the abnormality of the EGR device based on a result of comparison between the detected upstream-downstream differential pressure and a predetermined threshold value.

16. An engine control unit as claimed in claim 13, wherein the decreasing degree parameter-obtaining step includes estimating an insufficient amount of exhaust gas recirculation for an amount of exhaust gas recirculation to be obtained when the EGR device is normal, based on a difference in pressure between an upstream side and a downstream side of said throttle valve, as the decreasing degree parameter, and wherein said abnormality-determining step includes determining the abnormality of the EGR device based on a result of comparison between the estimated insufficient amount of exhaust gas recirculation and a predetermined threshold value.

17. An engine control unit as claimed in claim 14, wherein said predetermined threshold value is set in advance, based on the decreasing degree parameter obtained when the EGR device is abnormal, according to operating conditions of the engine.

18. An engine control unit as claimed in claim 13, wherein the abnormality-determining method further comprises an operating region-determining step of determining whether or not the engine is in a predetermined operating region in which the EGR device should recirculate exhaust gases in an amount larger than a predetermined amount, and wherein said abnormality-determining step includes executing determination of the abnormality of the EGR device when it is determined that the engine is in the predetermined operating region.

* * * * *